United States Patent [19]
Guzik et al.

[11] Patent Number: 6,094,047
[45] Date of Patent: Jul. 25, 2000

[54] METHOD AND APPARATUS FOR BALANCING ROTATING COMPONENTS OF A SPINSTAND OF A MAGNETIC HEAD AND DISK TESTER

[75] Inventors: Nahum Guzik, Palo Alto; Ilia M. Bokchtein, Santa Clara, both of Calif.

[73] Assignee: Guzik Technical Enterprises, San Jose, Calif.

[21] Appl. No.: 08/982,741

[22] Filed: Dec. 2, 1997

[51] Int. Cl.⁷ .......................... G11B 17/02; G11B 17/08; G11B 17/04
[52] U.S. Cl. .................. 324/262; 360/99.01; 360/99.07; 360/98.01; 360/98.07
[58] Field of Search ..................... 324/262, 226, 324/212; 360/97.01, 97.03, 98.01, 98.07, 99.08

[56] References Cited

U.S. PATENT DOCUMENTS

| | | | |
|---|---|---|---|
| 5,254,946 | 10/1993 | Guzik | 360/75 |
| 5,382,887 | 1/1995 | Guzik et al. | 318/652 |
| 5,537,272 | 7/1996 | Kazmierczak et al. | 360/99.08 |

*Primary Examiner*—Walter E. Snow
*Attorney, Agent, or Firm*—Lappin & Kusmer LLP

[57] ABSTRACT

An apparatus for balancing the spinstand of a magnetic head and disk testing system includes a base that rotationally supports a rotating spindle. The spindle supports a pack of disks and a slide moveable along guide rails of the spinstand. The slide, in turn, supports a stack of magnetic heads that is moveable in respect to the pack of disks. The spindle supports a balancing cap that has a plurality of threaded openings uniformly spaced in its peripheral surface. Imbalance is adjusted by threading screws into or out of the selected threaded openings. The value of imbalance is defined by vibration measurements; these measurements are performed by means of an accelerometer attached to the spindle housing, and of a rotary encoder that generates index pulse in a certain position of the spindle. In order to provide reliable measurements by means of the accelerometer, the spindle housing either can be fixed to test magnetic heads, or can be turned to a spring-loaded condition to increase sensitivity of the balancing procedure. Each time the disk pack is replaced, the system measures the amount of radial displacement of the screws in respective openings that is necessary to compensate the imbalance created by the new disk pack. The proposed balancing method includes manual or automated calibration procedure, automatic vibration measurements, and manual adjustment of the positions of screws in the balancing cap using the results of measurements.

36 Claims, 7 Drawing Sheets

Fig. 5

METHOD AND APPARATUS FOR BALANCING ROTATING COMPONENTS OF A SPINSTAND OF A MAGNETIC HEAD AND DISK TESTER

FIELD OF THE INVENTION

The present invention relates to systems and techniques for balancing rotating devices, and more particularly, to systems and techniques for balancing spinstands of magnetic head and disk testers so as to reduce vibration caused by an imbalance thereof.

BACKGROUND OF THE INVENTION

Many systems which require the non-volatile storage of digital data include a data storage device comprising a rotating magnetic coated disk and a transducer for reading and writing information stored on the magnetic material of the disk.

The transducers in such data storage devices are typically known as magnetic heads. After manufacturing, the magnetic heads may be evaluated on magnetic head and disk testers in order to measure their operational parameters and performance characteristics, which may include storage density, access speed to data locations, reliability, and data integrity. The mechanical part of such a tester is known as a spinstand. A spinstand generally includes a magnetic head support element and a rotatable magnetic disk pack support element, which is also referred to as a spindle. The magnetic head support element is slidably attached to the spinstand to facilitate linear movement of the magnetic heads relative to the disk and perpendicular to the axis of rotation (or equivalently, the spin axis) of the spindle. An example of a prior art spinstand is the Model S1701, manufactured by Guzik Technical Enterprises of San Jose, Calif., the assignee of the present invention.

To evaluate the magnetic heads, a test disk pack is installed on a spindle of a spinstand. A disk pack is a general term of art used to describe a set of one or more magnetic disks adapted for mounting as a unit on the spindle of a drive assembly. During testing, the disk pack may rotate at speeds exceeding 10000 rpm. Because the spindle of the spinstand rotates with such high speed, the spindle must be balanced carefully to avoid centrifugal forces which may cause vibrations of the spindle and disk pack mounted thereon and thus impair the accuracy of testing. Vibrations in the rotating elements can cause tracking errors of the magnetic heads over the disk track. Such tracking errors are particularly important in connection with high data density systems; the radial density of disk tracks in state-of-the-art data storage devices can be as high as 10000 tracks/inch. To minimize vibration, the continuum of centrifugal forces generated by the rotation of the disk pack are distributed uniformly about, and oriented perpendicular to, the axis of rotation. When the forces are so distributed, each centrifugal force vector generated by the disk pack is canceled by an equal force directed 180 degrees about the axis of rotation, so that no net force remains. An imbalance occurs when the centrifugal forces generated by the rotating disk pack are not uniformly distributed, and a net force directed radially outward from the axis of rotation remains because complete cancellation does not occur.

Since the disk pack, when installed on the spindle, will also rotate at high speeds, the disk pack must likewise be balanced to minimize vibration. In prior art systems, both the spindles and disk packs are balanced with general-purpose balancing machines, such as the BT-25 machine of Heins Balancing Systems, Inc.

Since the spindles are balanced independently of the disk packs, an imbalance may still exist when the disk pack is mounted to the spindle if the axis of rotation used to balance the spindle does not coincide with the axis of rotation used to balance the disk pack. Test disk packs must occasionally be removed from the spinstand and replaced as a result of damage or a revised test specification. Since each disk pack is unique, replacing a disk pack creates a potential imbalance and necessitates a new spindle/disk pack balancing procedure.

It is an object of this invention to provide a spinstand that is amenable to balancing of the spinstand spindle with a disk pack mounted on this spindle.

It is another object of this invention to provide a method for balancing a spinstand spindle with a disk pack mounted on this spindle.

It is a further object of this invention to provide a spinstand with a built-in automated system for imbalance measurements.

Yet another object of this invention is to realize automated means of balancing the spinstand spindle with a disk pack mounted on this spindle.

SUMMARY OF THE INVENTION

The present invention is directed to a method and apparatus for balancing the spinstand of a magnetic head and disk testing system. The apparatus comprises a disk support assembly which includes a spindle support coupled to a base member, a spindle which is rotatable with respect to said spindle support about an axis of rotation and a spindle driver for selectably driving the spindle to rotate about the axis of rotation. The support assembly also includes a position indicator which generates a signal representative of the instantaneous angular position of the spindle with respect to the spindle support.

The apparatus further comprises at least one balancing assembly affixed to the spindle so that the balancing assembly is rotatable with the spindle about the axis of rotation. Within the balancing assembly are a plurality of balancing weights, each weight being positioned along an associated radially directed path with respect to the axis of rotation. The weights are adjustable along the paths so as to cancel the effects of an inherent imbalance in the spindle and disk pack assembly. The apparatus also includes an accelerometer which generates a signal representative of radially directed acceleration of the spindle with respect to the base member, as a function of the angular position of said spindle about the axis of rotation. The apparatus further includes a computational element which determines the spindle angular position corresponding to a maximum acceleration of said spindle, and calculates a set of compensating positions of the balancing weights so as to cancel the maximum acceleration.

In accordance with one preferred embodiment of the invention, the computational element averages the signal representative of acceleration at corresponding angular positions for at least two revolutions of said spindle.

In another embodiment, the invention includes a mechanism which automatically adjusts the balancing weights so as to conform to said compensating positions determined by the computation element.

In yet another embodiment, the disk support assembly is flexibly mounted to the base member so as to prevent damping of the spindle vibrations by the base member. The invention also includes a securing mechanism for rigidly mounting the disk support element to the base member once the balancing procedure is completed.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE INVENTION

The present invention is directed to a method and apparatus for balancing the spinstand of a magnetic head and disk testing system.

Figure 1A:
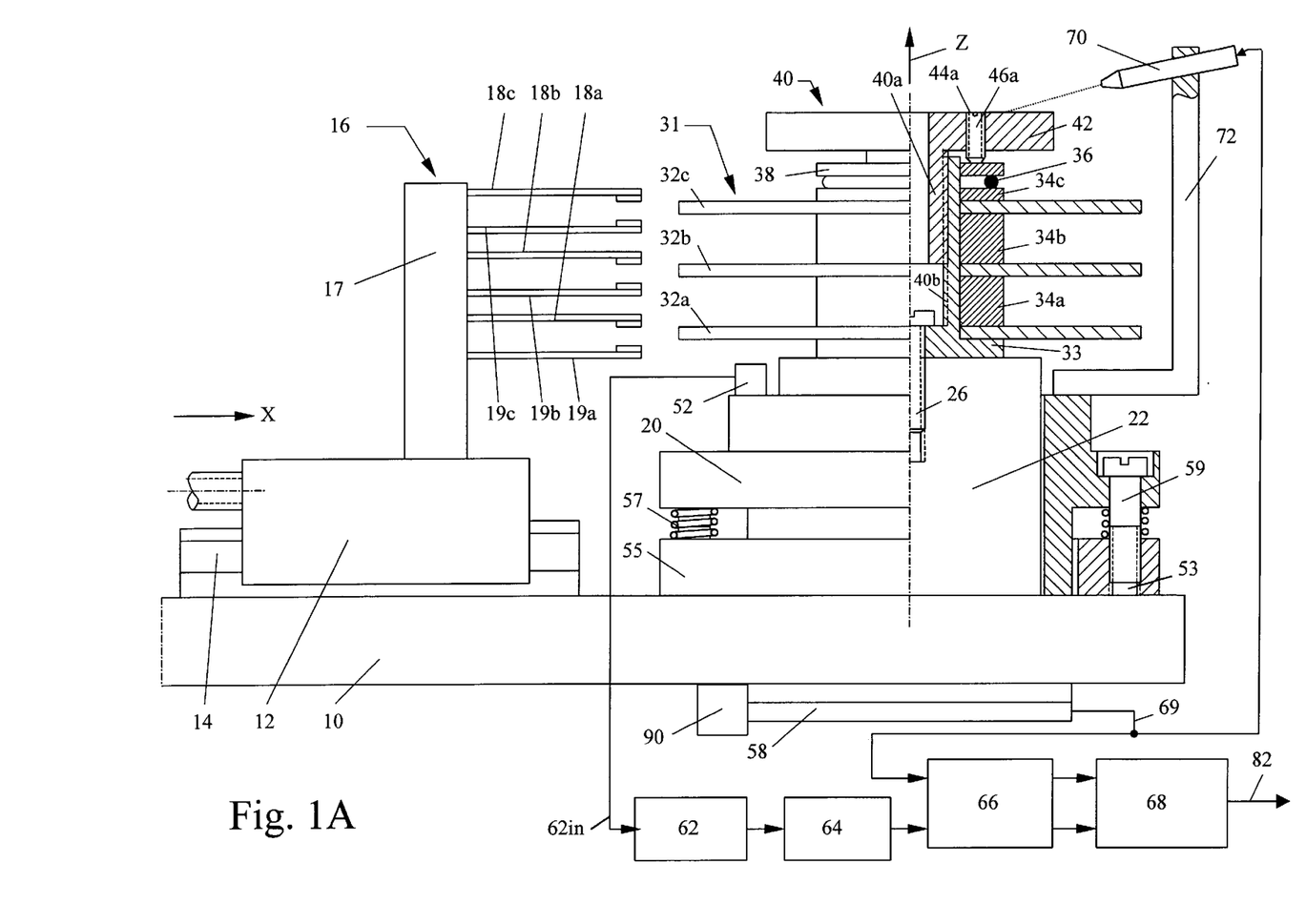
FIG. 1A is a schematic, partial sectional view of a spinstand of the present invention with a built-in balancing system.

A spinstand according to the present invention is schematically shown in FIG. 1A. In general, the invention includes a base plate 10 which supports a slide 12 and a spindle housing 20. The slide 12 is attached so as to allow linear motion upon guide rails 14 in the direction of a linear motion axis X. The slide 12 supports a magnetic head holder, e.g., a head stack 16 which consists of a head stack housing 17 that supports a plurality of magnetic heads 18a, 19a, 18b, 19b, 18c, 19c.

The spindle housing 20 includes rotatable spindle 22 mounted to spindle housing 20 via a bearing mechanism and a drive mechanism 90, so as to allow rotation of the spindle 22 about an axis of rotation Z which is perpendicular to the linear motion axis X. The rotating spindle 22 extends through the base plate 10 and is coupled to a rotary encoder 58. The encoder 58 generates an index pulse 69 which corresponds to one particular angular position of the spindle 22 with respect to the spindle housing 20. Consequently, as the spindle 22 rotates, the encoder 58 generates a sequence of index pulses 69, wherein the period between pulses 69 corresponds to a single rotation of the spindle 22. In one embodiment, the rotary encoder 58 may be implemented by the HEDS-9140 rotary encoder module, produced by Hewlett Packard Company.

The spindle 22 supports a disk pack 31, which includes a disk pack base 33 and magnetic disks 32a, 32b, 32c. The disk pack base 33 is attached to the spindle 22 by means of a screw 26. The magnetic disks are spaced from each other by spacers 34a, 34b and are mounted to the disk pack base 33. Magnetic disk 32a rests on flange portion of the disk pack base 33, spacer 34a rests on the upper surface of disk 32a, spacer 34b rests on the upper surface of magnetic disk 32b, magnetic disk 32c rests on the surface of spacer 34b, and so on, so that the disks are sandwiched between the spacers. The upper surface of upper disk 32c supports a spacer 34c that, in turn, supports a compressible, resilient spacer 36. A pre-loading spacer 38 is placed onto the spacer 36.

For testing, heads 18a, 19a, 18b, 19b, 18c, 19c are loaded onto respective surfaces of magnetic disks 32a, 32b, and 32c for writing information into and reading information from the respective disks. Heads 18a, 18b, 18c engage upper surfaces of the magnetic disks, and heads 19a, 19b, 19c engage lower surfaces of the disks.

The disks and the spacers of the disk pack 31 are fixed on the disk pack base 33 by means of a balancing cap 40. This cap consists of a threaded cylinder 40a and a balancing part 42. The cylinder 40a is screwed into a threaded opening 40b made in the upper end of disk pack base 33. In the embodiment illustrated in FIG. 2, six pre-loading openings 44a through 44f are disposed within balancing part 42, parallel to the axis of rotation Z. Six pre-loading weights 46a through 46f are screwed into the threaded pre-loading openings 44a through 44f, respectively, to compress pre-loading spacer 36 and to pre-load the disk pack in the direction of the axis of rotation Z. In general, the number of pre-loading openings 44 may be more or less than 6, and the pre-loading weights 46 may be secured to and adjusted within the openings 44 via other means known to those skilled in the art. FIG. 1A shows the balancing part 42 and the disk pack 31 partially sectioned along an axis which intersects the axis of rotation Z, the pre-loading opening 44a and the pre-loading weight 46a. Although in the illustrated embodiment the balancing part is integrated with the balancing cap and thus removable, other embodiments may include one or more balancing elements rigidly attached to the spindle 22.

Figure 1B:
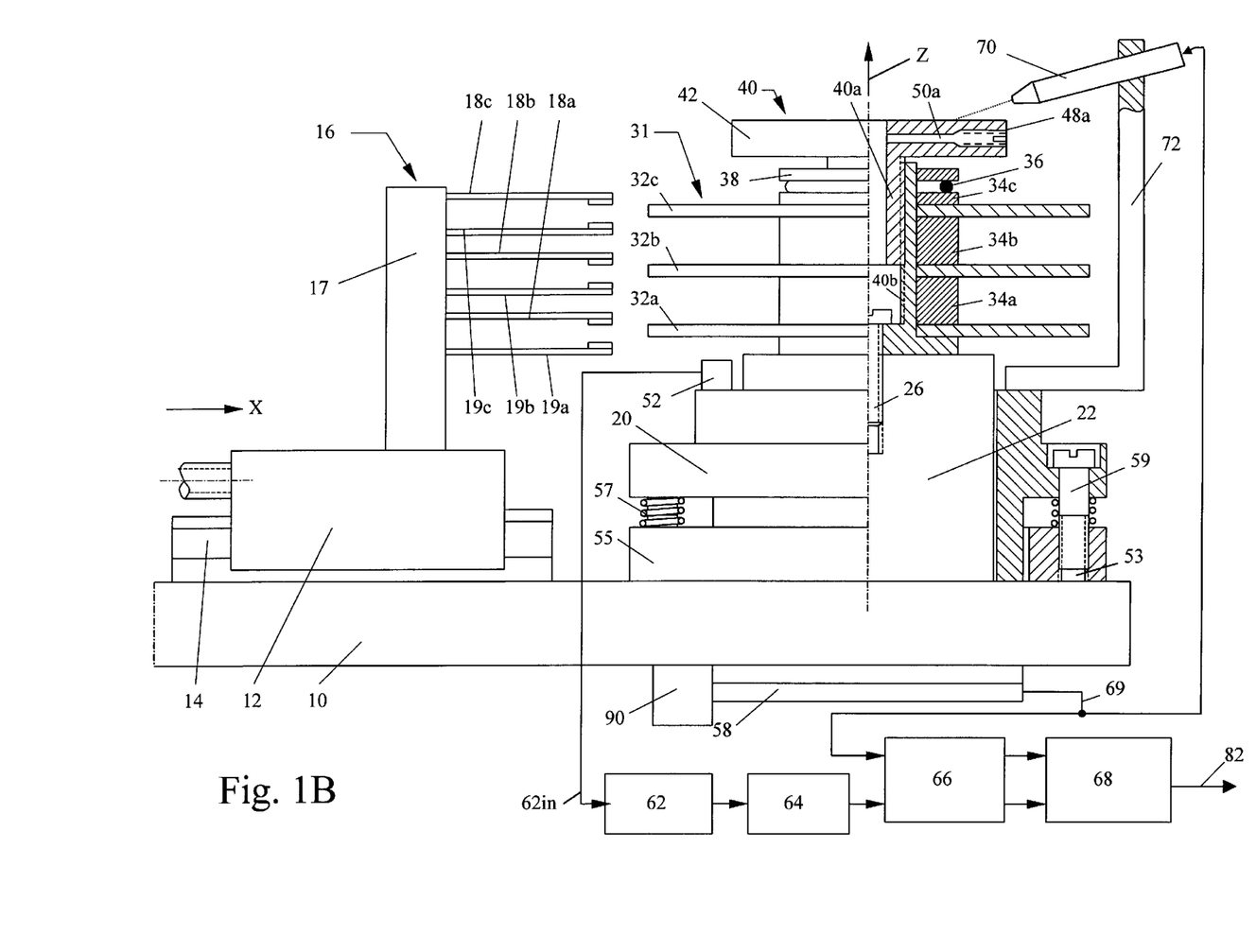
FIG. 1B is another schematic, partial sectional view of the spinstand depicted in FIG. 1A, illustrating one of the balancing weights.
Figure 1C:
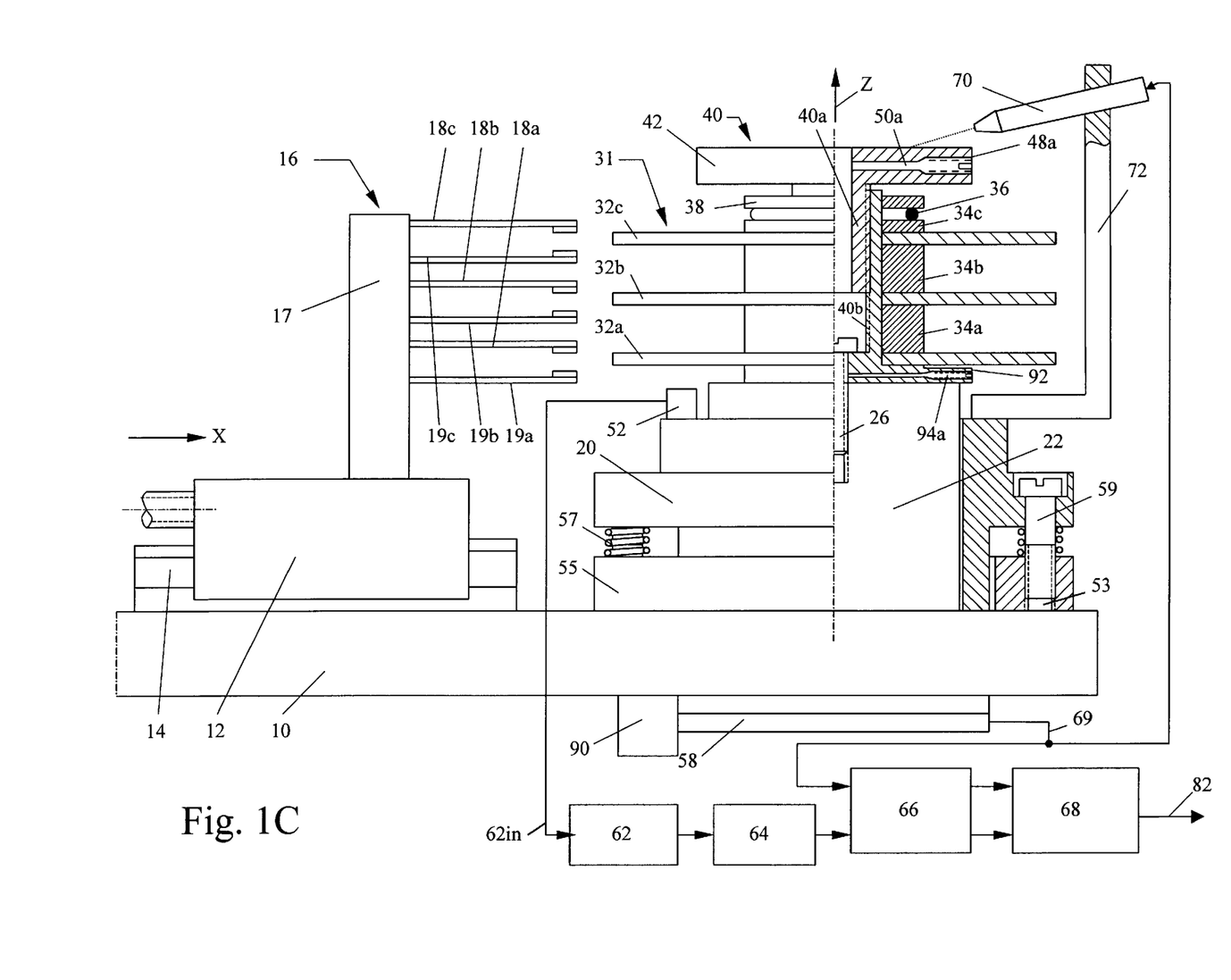
FIG. 1C is yet another schematic, partial sectional view of the spinstand depicted in FIG. 1A, illustrating a second balancing element.
Figure 2:
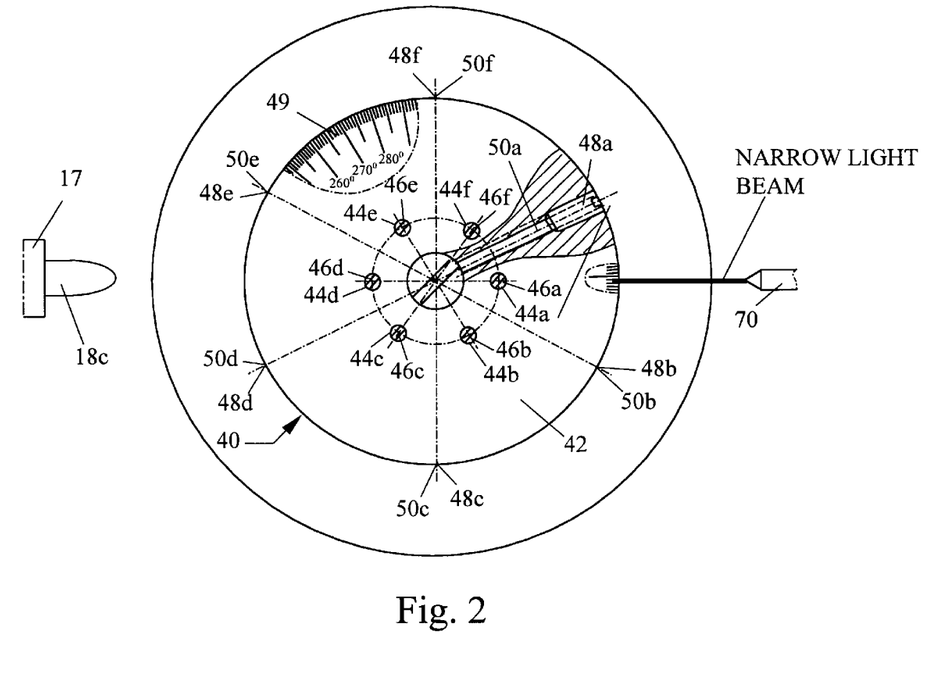
FIG. 2 is a sectional top view of the spinstand of FIG. 1A.

As shown in FIG. 2, balancing part 42 of the balancing cap 40 has six threaded balancing openings 48a through 48f drilled along six uniformly spaced radii of the part 42. Balancing weights 50a through 50f are screwed into the balancing openings 48a through 48f, respectively, to realize the balancing procedure. In other embodiments of the invention, the number of balancing openings may be more or less than six, and the balancing weights may be asymmetrically distributed about the axis of rotation Z, i.e., along non-uniformly spaced radii of the part 42. In the illustrated embodiment, the positions of the balancing weights are adjustable along paths which are radially directed with respect to the axis of rotation. In other embodiments, the adjustment paths may assume other orientations, so that only a component of the adjustment is radially directed. FIG. 1B shows the balancing part 42 and the disk pack 31 partially sectioned along an axis which intersects the axis of rotation Z, the balancing opening 48a and the balancing weight 50a. FIG. 1C shows an alternate embodiment of the invention which includes a second balancing part 92 located below the magnetic disks and a second set of balancing weights 94. In the section view of FIG. 1C, balancing weights 50a and 94a are illustrated.

The balancing system of the present invention includes an accelerometer 52 which is attached to spindle housing 20. The Model 141 accelerometer, produced by Setra Systems, Boxborough, Mass., is an exemplary accelerometer 52 suitable for the purposes of the present invention. The spindle housing 20 either may be rigidly attached to an adapter 55 that is fixed to base plate 10, or may have a flexible connection to base plate 10 through the springs 57. In the latter case, the spindle housing 20 may be rigidly attached to the base plate 10 via anchor screws 59. As the anchor screws 59 are threaded into threaded openings 53, the springs 57 are compressed and the spindle housing 20 is drawn towards the base plate 10. When the anchor screws 59 are fully engaged into the threaded openings 53, the spindle housing is rigidly attached to the base plate 10. A flexible coupling between the spindle housing 20 and the base plate 10 (i.e., when the anchor screws 59 are disengaged) prevents the base plate 10 from damping vibrations of the spindle housing 20 and the accelerometer 52, thus providing a more accurate measure of the forces experienced by the spindle housing 20. When the balancing procedure is complete, the spindle housing 20 and accelerometer 52 are secured to the base plate 10 by engaging the anchor screws 59.

A light source (e.g., laser pen) 70 mounted on a support 72 is used to achieve proper balancing results after installation the disk pack 31 with the balancing cap 40 in some arbitrary angular position in respect to the spindle 22. The support 72 is connected to the spindle housing 20. The light of the source 70 turns on when the index pulse 69 comes from the encoder 58. As shown in FIG. 2, the narrow light beam illuminates a scale 49 engraved on the upper surface of the balancing cap 40. The ticks of the scale 49 mark discrete angular positions of the balancing cap 40. The angular position which corresponds to the 0 tick of this scale is the same angular position as one of the openings 48, for example, opening 48a. Therefore the illuminated tick of the scale 49 provides an indication of the angular shift between the index pulse 69 and the zero-angle point of the scale 49. Accelerometer 52 is connected to input 62in of a preamplifier/filter 62. An output of the preamplifier/filter 62 is connected to an input of an analog-to-digital converter (hereinafter referred to as ADC) 64. An output of the ADC 64 is connected to a computer 68 via an interface 66. The sequence of index pulses 69 from the encoder 58 is also connected to the computer 68 via the interface 66. The preamplifier/filter 62, the ADC 64, the interface 66, and the computer 68 form a measurement data processing unit (hereinafter referred to as MDPU).

The signal from the accelerometer 52 to the MDPU is representative of the instantaneous force experienced by the accelerometer 52. The MDPU receives this signal along with the sequence of index pulses 69 and generates $A(\phi)$, a signal which is representative of the force experienced by the accelerometer, or equivalently the force experienced by the spindle housing 20, as a function of spindle angular position $\phi$. In the illustrated embodiment, the accelerometer 52 measures linear acceleration in a direction which is substantially perpendicular to the axis of rotation Z. In other embodiments, the accelerometer may measure linear acceleration in one or more other directions which may or may not be orthogonal to axis of rotation Z. In one embodiment, the accelerometer measures acceleration in three mutually orthogonal directions so that an acceleration in any direction may be determined by analyzing its components in a Cartesian reference frame. In yet another embodiment, the accelerometer may measure the angular acceleration of the spindle in addition to one or more of the linear accelerations described herein.

Figure 3A:
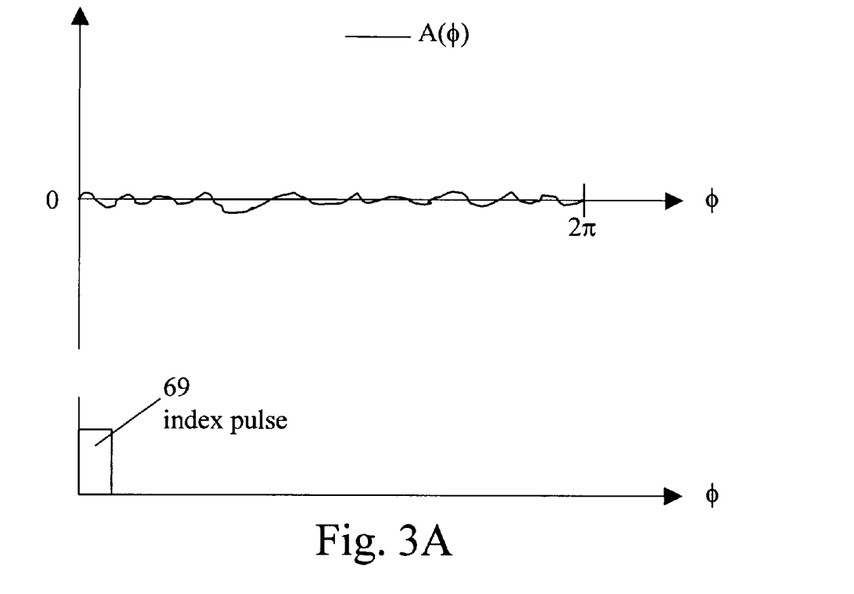
FIG. 3A is a timing diagram of various signals from the spinstand of FIG. 1A when the spinstand is in an optimally balanced condition.
Figure 3B:
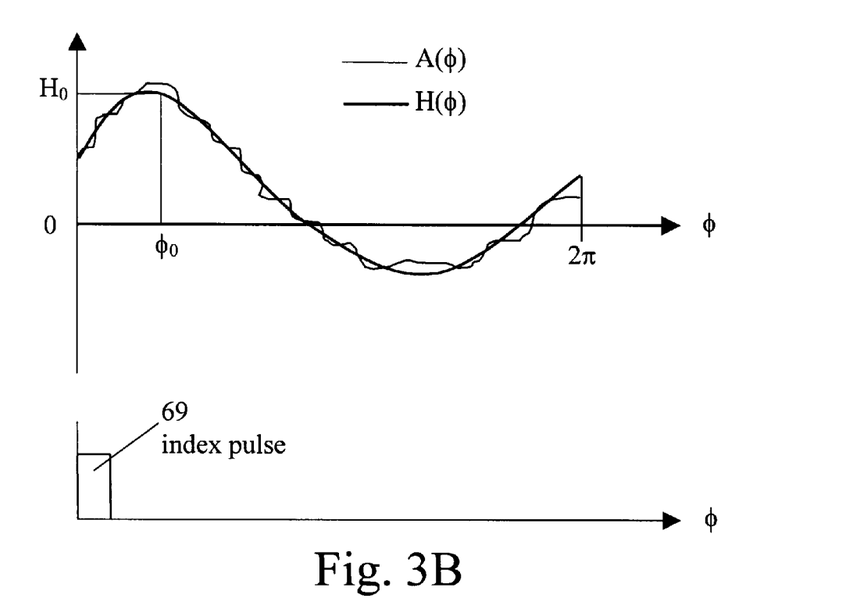
FIG. 3B is a timing diagram of various signals from the spinstand of FIG. 1A when the spinstand is in a significantly unbalanced condition.

During a single measurement operation, the MDPU determines $A(\phi)$ for one full turn of the spindle 22 with the disk pack 31 and the balancing cap 40 attached. Angular position $\phi=0$ is defined as the angular position of the spindle when the index pulse 69 is issued by the rotary encoder 58. When the spindle 22, disk pack 31 and balancing cap 40 are perfectly balanced, the measured $A(\phi)$ is zero except for noise, as shown in FIG. 3A. When an imbalance condition exists in the spindle 22, disk pack 31 and balancing cap 40, the measured $A(\phi)$ includes a significant main harmonic component $H(\phi)$ in addition to the noise, as is shown in FIG. 3B. The main harmonic may be expressed mathematically as $H(\phi)=H_0[\sin(\phi+\phi_0-\pi/2)]$. An imbalance condition exists because a net, residual centrifugal force vector F acts upon the spindle 22, in a direction away from the axis of rotation, which was not canceled by an equal force directed 180 degrees about the axis of rotation Z. The amplitude $H_0$ of the main harmonic $H(\phi)$ of the vibration is proportional to the magnitude $|F|$ of the centrifugal force vector F, and the phase shift $\phi_0$ of this harmonic determines the angular position of the vector F. The angular positions of the balancing weights 50a through 50f with respect to index pulse 69, the masses $m_i$ and the thread pitches $t_i$ for these screws are all constants and easily measurable. The proportionality coefficient c between $|F|$ and $H_0$ may be determined once $A(\phi)$ has been measured, so it is possible to find (by scalar multiplication) the component $F_i$ of F in the direction of each screw $S_i$ and to compensate this component by rotating the screw $S_i$ to the angle $$\theta_i = \frac{2\pi|F_i|}{m_i t_i \omega^2},$$

where $\omega$ is the angular speed of spindle rotation, for all i from a to f.

The detrimental effects of noise on the measurement may be reduced by a factor of $\sqrt{N}$ by repeating the above-described measurement N times and averaging the results, since noise which is independent of the harmonic will not correlate over subsequent samples.

The value of the residual centrifugal force F is proportional to the amplitude $H_0$ of the main harmonic of vibration, but not necessarily to the amplitude $A_0$ of the vibration $A(\phi)$ because of the other harmonic components of $A(\phi)$. Real angular position $\phi_0$ of F should also be measured from the main harmonic of vibration rather than the vibration itself. The values of $A_0$ and $H_0$ are very close, and the value of $\phi_0$ can be measured accurately when the imbalance is high. However, the influence of other harmonics substantially decreases the accuracy of measurements when the vibration curve $A(\phi)$ is used by itself to find F. Uni-dimensional correlation analysis leads to the best (in the mean-square sense) approximation of the main harmonic $H(\phi)$ from the vibration curve $A(\phi)$. Since it is only necessary to find one harmonic, correlation procedure is straightforward and can be realized using the equations:

$$\theta_0 = \tan^{-1}\left[\frac{\int_0^{2\pi} A(\phi)\sin\phi\, d\phi}{\int_0^{2\pi} A(\phi)\cos\phi\, d\phi}\right]$$

$$H_0 = \frac{1}{\pi}\left[\cos\phi_0 \int_0^{2\pi} A(\phi)\cos\phi\, d\phi - \sin\phi_0 \int_0^{2\pi} A(\phi)\sin\phi\, d\phi\right]$$

Although these equations describe the integration of continuous functions, those skilled in the art will recognize that an integral may be replaced by a summation when the function to be evaluated is expressed as a set of discrete data samples.

The balancing equipment of a new spinstand must initially be calibrated prior to using the spinstand for testing magnetic heads and disks. The initial calibration procedure begins by mounting a special reference disk pack 31 and the balancing cap 40 onto the spindle 22. The angular position of the disk pack 31, balancing cap 40 and spindle combination is adjusted until the light source 70 points to zero angle of the scale 49 engraved on the upper surface of the balancing cap. Balancing weight 50a, having a known mass $m_{init}$, is adjusted to a known radial position $r_{init}$ in the opening 48a, in order to create a known, controlled imbalance. The magnetic heads 18 and 19 are moved away from respective magnetic disks 32 by moving slide 12 along the rails 14 until the heads 18 and 19 are well clear of the disks 32. The anchor screws 59 are disengaged from the base plate 10 to create a flexible coupling between the spindle housing 20 and the base plate 10. The disk pack 31, balancing cap 40 and spindle combination is then caused to rotate at a minimum available speed. A residual force $F_{init}$, where $|F_{init}|=m_{init}\omega^2 r_{init}$, acts upon the spindle and disk pack assembly in the direction of the balancing weight 50a due to the imbalance caused by the balancing weight 50a, assuming the initial imbalance force to be negligible in comparison to F. The resulting vibration is detected by the accelerometer 52 and is sampled by the MDPU.

For each revolution of the spindle 22, the MDPU samples the signal from the accelerometer 52 to generate an $A(\phi)$ dataset for $0 \leq \phi < 360°$. The MDPU continues to sample the signal from the accelerometer 52 for N (e.g., 64) revolutions of the spindle 22. The MDPU then generates a composite $\overline{A}(\phi)$ dataset from the N collected data sets. One embodiment of the invention uses a simple arithmetic mean calculation to generate the composite $\overline{A}(\phi)$, other methods of combining a plurality of data sets may be used, for example a weighted mean, a geometric mean or a harmonic mean. The main harmonic $H(\phi)$ of the vibration is then determined by the above-described correlation method, and the maximum value Ho and the phase shift a $\alpha_0$ are determined. The proportionality coefficient c which relates $|F|$ to $H_0$ is then calculated, where $c=m_{init}\omega^2 r_{init}/H_0$. The values of c and $\alpha_0$ are stored and maintained in a non-volatile memory storage device.

The above-described procedure is repeated at various rotational speeds, so as to generate and store several sets of values of c and $\alpha_0$, each of which are representative of the entire working range. Since the index pulse 69 corresponds to zero angle of the scale 49 on the balancing cap 40, and to the position of the screw 48a that creates imbalance, $\alpha_0$ corresponds to the phase shift that is inherent to data acquisition circuitry including accelerometer 52 and filter/preamplifier 62.

During normal testing procedure, the balancing equipment of the spinstand must be calibrated for each new disk pack 31 and balancing cap 40 mounted to the spindle 22 of the spinstand of the invention. One possible manual calibration procedure is as follows:

1. The magnetic heads 18 and 19 are moved away from respective magnetic disks 32 by moving slide 12 along the rails 14 until the heads 18 and 19 are well clear of the disks 32.
2. The anchor screws 59 are disengaged from the base plate 10 to create a flexible coupling between the spindle housing 20 and the base plate 10.
3. The new disk pack 31 and balancing cap 40 are mounted onto the spindle 22. The spindle is rotated manually until an index pulse 69 causes the light source 70 to illuminate the scale 49 engraved on the upper surface of the balancing cap. The tick value illuminated on the scale 49 is acquired, sent to the MDPU and added to the values of $\alpha_0$ established and stored during initial calibration to generate new values of $\alpha_0$, designated $\alpha_0'$. In the illustrated embodiment, the tick value which is illuminated by the light source 70 is manually read by a user and provided to the MDPU via manual entry means (not shown), although other embodiments may incorporate automatic acquisition and MDPU entry means. The new phase shift $\alpha_0'$ corresponds to the phase shift that is inherent to data acquisition circuitry; it accounts for the angular offset between the index pulse 69 and the zero tick of the scale 49 on the new balancing cap 40.

An automated calibration procedure can be used as an alternative to the manual calibration described above. One possible automated calibration procedure is as follows:

1. Move the magnetic heads 18 and 19 away from respective magnetic disks 32 by moving slide 12 along the rails 14 until the heads 18 and 19 are well clear of the disks 32.
2. Disengage the anchor screws 59 from the base plate 10 to create a flexible coupling between the spindle housing 20 and the base plate 10.
3. Mount new disk pack 31 with the balancing cap 40 onto the spindle 22 in an arbitrary position. Install the balancing weights 50a through 50f, each having the same mass m, into the predetermined initial positions of the openings 48a through 48f, respectively (i.e., locate all of them at the same distance r from the axis of rotation of the balancing cap 40).
4. Establish spindle 22 rotation at the angular speed ω that will be used for testing. If any initial imbalance is present, it will be manifested by a vibration $A(\phi)$ which corresponds to a residual centrifugal force F in FIG. 4. $A(\phi)$ is detected by the accelerometer 52 and received by the MDPU. The MDPU calculates a composite $\overline{A}(\phi)$ from the $A(\phi)$ data gathered over N (e.g., 64) revolutions of the spindle 22. The MDPU determines the main harmonic $H(\phi)$ of the vibration by the above-described correlation processing, and the MDPU subsequently determines the maximum value $H_0$ and the phase shift $\phi_0$.
5. Stop spindle 22 rotation, and change the position of the balancing weight 50a (e.g., screw it out of the opening 48a) to obtain a new imbalance condition. This imbalance corresponds to a centrifugal force $F_1$ in FIG. 4.
6. Establish spindle 22 rotation again at the speed ω that will be used for testing. A different vibration $A_1(\phi)$ arises as a result of the new imbalance condition. $A_1(\phi)$ is detected by the accelerometer 52 and received by the MDPU. The MDPU calculates a composite $\overline{A}(\phi)$ from the $A(\phi)$ data gathered over N (e.g., 64) revolutions of the spindle 22. The MDPU determines the main harmonic $H_1(\phi)$ of the vibration by the above-described correlation processing, and the MDPU subsequently determines the maximum value $H_1$ and the phase shift $\phi_1$.

Figure 4:
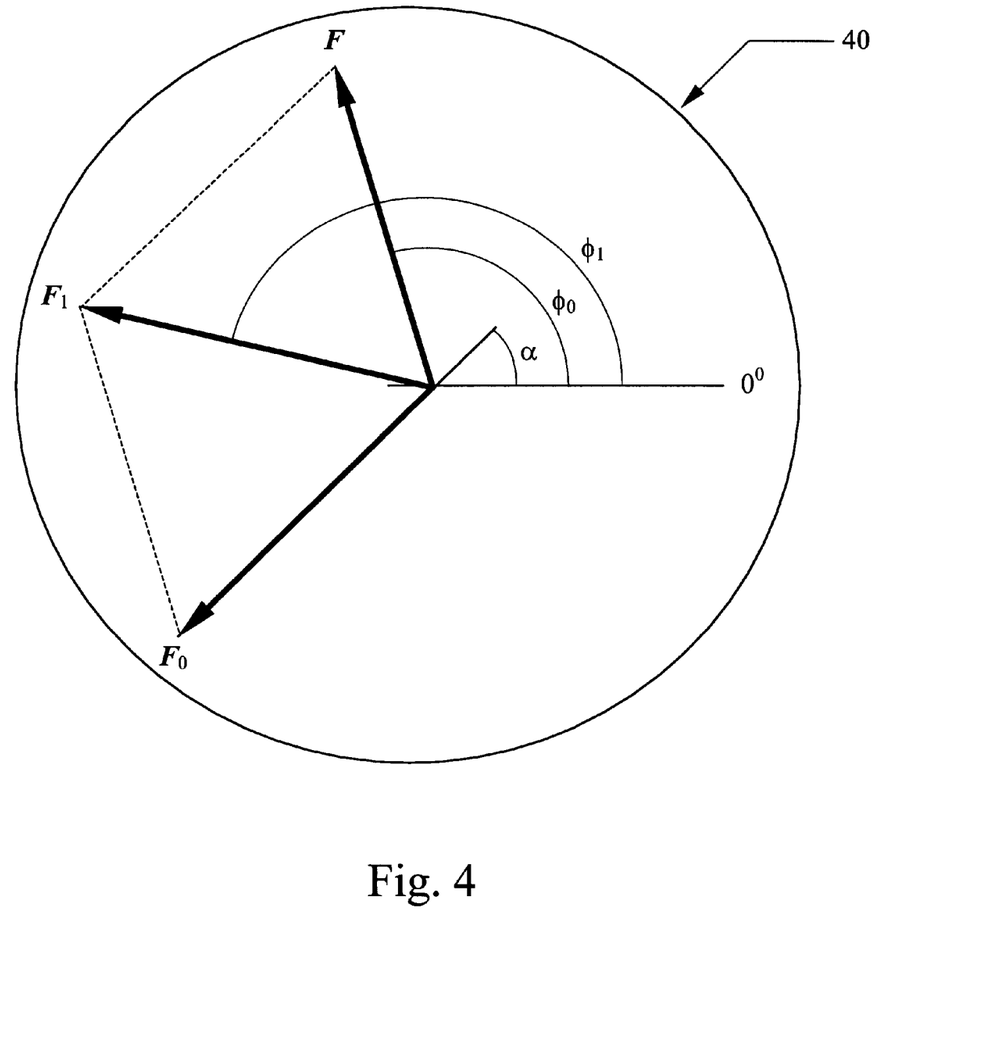
FIG. 4 displays the centrifugal forces applied to spindle and disk pack system during automated calibration procedure.

The force $F_1$ is a vector sum of the force F and a vector $F_0$, where $|F_0|=m\omega^2 r$, is oriented along the radial axis at $\phi=\pi+\alpha$ and is caused by the change of position of balancing weight 50a, as shown on FIG. 4. The value of the phase shift a between the angular position of the opening 48a in the balancing cap 40 and the angle of index pulse ($\phi=0$) can be defined using the formula:

$$\tan \alpha = \frac{\sin\phi_1 + \frac{F}{F_1}\sin\phi_0}{\cos\phi_1 + \frac{F}{F_1}\cos\phi_0}$$

$$= \frac{\sin\phi_1 + \frac{H_0}{H_1}\sin\phi_0}{\cos\phi_1 + \frac{H_0}{H_1}\cos\phi_0}$$

The proportionality coefficient c between |F| and $H_0$ can then be found from the formula $$c = \left(\frac{m\omega^2 r}{H_0}\right)\left(\frac{\sin(\alpha - \phi_1)}{\sin(\phi_1 - \phi_0)}\right)$$

After finishing measurements and calculating the values of α and c, spindle rotation is stopped, and the balancing weight 50a is returned to its initial position. The above-described automated balancing procedure is more accurate than the manual procedure since the value of initial imbalance is taking into account when calculating α. Light source 70 is not necessary to realize the automated procedure.

One possible procedure for balancing a spinstand, spindle and disk pack system is as follows:

1. Move the magnetic heads 18 and 19 away from respective magnetic disks 32 by moving slide 12 along the rails 14 until the heads 18 and 19 are well clear of the disks 32.
2. Disengage the anchor screws 59 from the base plate 10 to create a flexible coupling between the spindle housing 20 and the base plate 10.
3. Mount a new disk pack 31 with a balancing cap 40 onto the spindle 22 in an arbitrary position. Install the balancing weights 50a through 50f, each having the same mass m, into the predetermined initial positions of the openings 48a through 48f (i.e., locate all of them at the same distance r from the axis of rotation of the balancing cap 40).
4. Follow either the manual calibration procedure or the automated calibration procedure to determine the parameters c and α.
5. Establish rotation of the spindle 22 with the disk pack 31 and the balancing cap 40 at working speed ω. $A_2(\phi)$ is detected by the accelerometer 52 and received by the MDPU. The MDPU calculates a composite $\overline{A}_2(\phi)$ from the $A_2(\phi)$ data gathered over N (e.g., 64) revolutions of the spindle 22. The MDPU determines the main harmonic $H_2(\phi)$ of the vibration by the above-described correlation processing, and the MDPU subsequently determines the maximum value $H_2$ and the phase shift $\phi_2$. The MDPU determines the force magnitude $|F_2|=cH_2$ and the angular position $\phi_2-\alpha$ of the force $F_2$ with respect to zero angle at the balancing cap 40, using the values of c and α determined at the calibration stage. The force $F_2$ is then resolved into components in the directions of the screws using the geometrical parameters of the balancing cap 40 and vector analysis techniques known to those skilled in the art. Since positions and weights of the screws 50a through 50f are known, the positional changes of the balancing weights 50a through 50f which are necessary to cancel the components of $F_2$ can be readily calculated by the MDPU.
6. Stop spindle rotation and correct the positions of the screws 50a though 50f as prescribed by step 5.
7. Establish rotation of the spindle 22 with the disk pack 31 and the balancing cap 40 at working speed ω. $A(\phi)$ is detected by the accelerometer 52 and received by the MDPU. The MDPU calculates a composite $\overline{A}(\phi)$ from the $A(\phi)$ data gathered over N (e.g., 64) revolutions of the spindle 22. If the amplitude of $A(\phi)$ is within a predetermined limit, the balancing procedure is complete. Otherwise, repeat steps 5 and 6.

When the amplitude of $A(\phi)$ is within a predetermined limit, the anchor screws 59 are tightened, so that the spindle housing 20 is rigidly fixed to the base plate 10. The spinstand is then ready for testing the head stack 16 with the magnetic disk pack 31.

Figure 5:
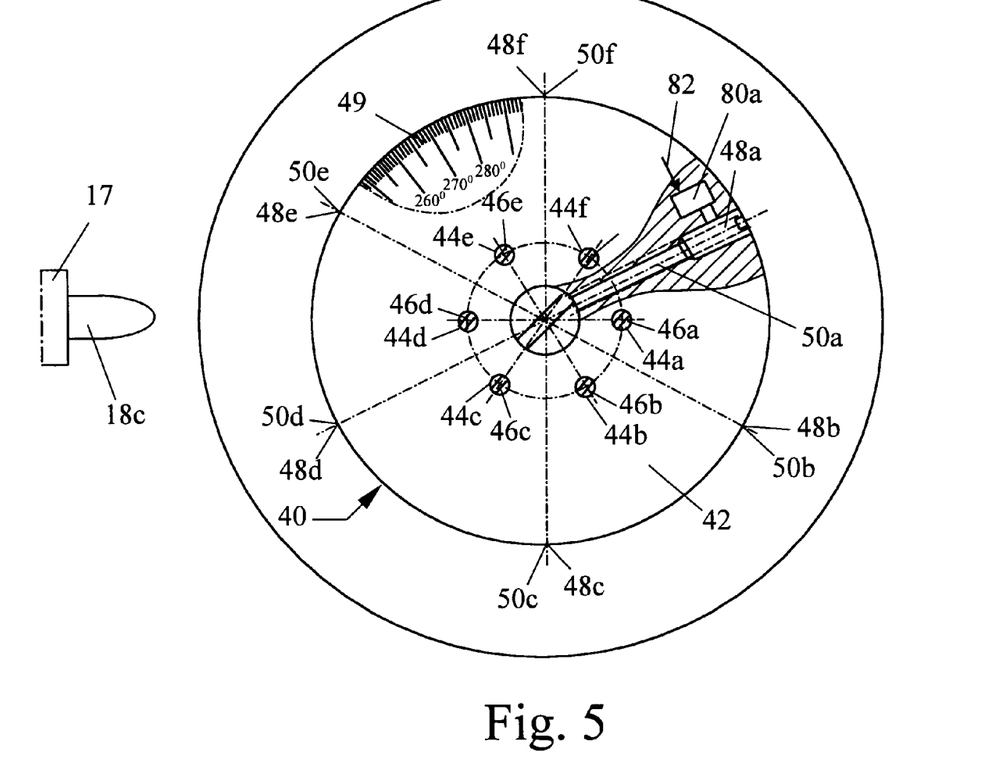
FIG. 5 shows correction mechanism coupled to balancing screw.

In other embodiments of the invention, the positions of the balancing screws 50a through 50f may be corrected by a correction mechanism 80 located on the spindle 22 or on the balancing element. FIG. 5 shows correction mechanism 80a coupled to balancing screw 50a. The correction mechanism 80 may include an electric motor actuator (i.e., a rotational motor driving a gear mechanism or a linear motor driving a mechanical linkage), a pneumatic actuator, a hydraulic actuator or an electro-magnetic actuator. The correction mechanism 80 receives a correction signal 82 from the MDPU corresponding to the positional changes described herein (in step 5 of the procedure for balancing a spinstand, spindle and disk pack system).

Although the invention has been shown and described with reference to specific examples, it is understood that these examples do not limit the field of application of the invention and that any modification and change is possible within the limits of the appended claims. For example, a balancing part 42 is not necessarily an integral part of the balancing cap 40, and can be installed on the spinstand spindle as a separate part. Two balancing caps, one at the upper end and another at the lower end of the disk pack 31, may be used for balancing purposes. The balancing cap may have more or less than six threaded openings 48a through 48f. Floating connection of the spindle housing 20 to the base plate 10 may be realized using rubber pads instead of springs 57. Although the spinstand was described in connection with magnetic head testing, the same spinstand and the same balancing procedure are applicable for testing magnetic disks or disk packs.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A spinstand of a magnetic head and disk tester including a balancing system for balancing rotating components, comprising:
    A. a disk support assembly including:
        i. spindle support coupled to a base member;
        ii. a spindle, rotatable with respect to said spindle support about a spin axis;
        iii. drive means for selectably driving said spindle to rotate about said axis; and
        iv. means for producing an position signal representative of an angular position of said spindle with respect to said spindle support;
    B. at least one balancing assembly affixed to said spindle said balancing assembly being rotatable with said spindle about said spin axis and having interior thereto a plurality of balancing weights, each weight being adjustably positioned along an associated path, said paths being at least in part radially directed with respect to said spin axis; and, C. means for generating a signal, representative of radially directed acceleration of said spindle with respect to said base member, as a function of the angular position of said spindle about said spin axis.

2. A spinstand according to claim 1, further comprising a computational element including means for identifying the spindle angular position corresponding to a maximum acceleration of said spindle, and means for calculating a set of compensating positions of said balancing weights so as to reduce said maximum acceleration.

3. A spinstand according to claim 2, further including means for calculating a set of compensating positions of said balancing weights so as to reduce said maximum acceleration to substantially zero.

4. A spinstand according to claim 1, wherein said disk support assembly is flexibly mounted to said base member and includes means for temporarily mounting said disk support element rigidly to said base member.

5. A spinstand according to claim 4, wherein said means for temporarily mounting includes a plurality of anchor screws, each of which passes through an aperture in said disk support assembly and engages a threaded aperture in said base member, thereby fixedly coupling said disk support assembly to said base member.

6. A spinstand according to claim 1, including means for securing a disk pack to said spindle, wherein said disk pack includes a disk pack base and at least one magnetic disk.

7. A spinstand according to claim 6, wherein said disk pack includes at least two magnetic disks and at least one spacer between each pair of said magnetic disks, said means for securing includes a base screw which passes through an aperture in said disk pack base and engages a threaded aperture in said spindle, and further includes a plurality of screws disposed through said balancing assembly and substantially parallel to said spin axis, each of which engages a threaded aperture in said balancing assembly and applies a force to a uppermost of said magnetic disks, thereby compressing said plurality of magnetic disks and spacers against said spindle.

8. A spinstand according to claim 2, wherein said computational element includes:

A. a signal filter and preamplifier element for receiving an acceleration signal corresponding to said acceleration of said spindle from said means for measuring an acceleration, and generating a conditioned signal as a function of said acceleration signal;

B. an analog-to-digital converter for receiving and sampling said conditioned signal and generating a digitized signal as a function of said conditioned signal;

C. an interface element for receiving said digitized signal and said positional signal and providing said signals to a computer element in a form compatible with said computer element.

9. A spinstand according to claim 1, wherein said means for generating a signal generates a signal representative of acceleration in a first direction, in a second direction and in a third direction, wherein each said direction is mutually orthogonal to the other two directions.

10. A spinstand according to claim 2, including means for adjusting said balancing weights so as to conform to said compensating positions calculated by said computational element.

11. A spinstand according to claim 10, wherein said means for adjusting is selected from the group consisting of an electrical motor actuator, a pneumatic actuator, a hydraulic actuator, an electromagnetic actuator, and a mechanical linkage actuator.

12. A method for balancing rotating components of a spinstand of a magnetic head and disk tester including a coaxial disk pack affixed to a spindle and said spindle and disk pack being rotatable about a spin axis with respect to a spindle support, said spindle support being coupled to a base member, comprising the steps of:

A. providing at least one balancing assembly having at least one balancing weight adjustably attached thereto, said balancing assembly being affixed to said spindle;

B. rotating said spindle and said disk pack about said spin axis at a predetermined angular speed;

C. generating a signal corresponding to radially directed acceleration of said spindle with respect to said base member as a function of an angular position of said spindle;

D. analyzing said signal so as to determine a maximum value of said acceleration and to identify a spindle angular position corresponding to said maximum value;

E. determining, in response to said determined maximum value and said identified angular position, a compensating position for each of said balancing weights so as to reduce said maximum value of said acceleration.

13. A method according to claim 12, wherein each of said balancing weights is adjustably positioned along an associated path, said paths being radially directed with respect to said spin axis.

14. A method according to claim 13, wherein said step of determining a compensating position further includes the substeps of:

i. determining a first force vector corresponding to said maximum value of acceleration and said spindle angular position;

ii. determining a second force vector having an magnitude equal to said first force vector and a direction opposite to said first force vector;

iii. resolving said second force vector into at least one component along of said associated paths.

15. A method according to claim 14, wherein said each of said balancing weights includes a screw, and further including the step of rotating an $i^{th}$ screw by an angle $\theta_i$ to achieve said compensating position, said angle $\theta_i$ being expressed by $$\theta_i = \frac{2\pi |F_i|}{m_i t_i \omega^2},$$

where $F_i$ represents the component of said second force along said radial path of said $i^{th}$ screw, $m_i$ represents a mass of said $i^{th}$ screw, $t_i$ represents a thread pitch of said $i^{th}$ screw and $\omega$ represents the angular speed of said balancing assembly, for all i from 1 to J, where J represents the number of balancing weights in said balancing assembly.

16. A method according to claim 12, wherein said balancing assembly includes means for adjusting said balancing weights so as to conform to said compensating positions.

17. A method according to claim 16, wherein said means for adjusting is selected from the group consisting of an electrical motor actuator, a pneumatic actuator, a hydraulic actuator, an electromagnetic actuator, and a mechanical linkage actuator.

18. A method according to claim 12, wherein said spindle support is flexibly coupled to said base member, so as to prevent transfer of a spindle vibration to said base member.

19. A method according to claim 12, wherein said step of analyzing said signal includes the substep of averaging said received signal at corresponding angular positions for at least two revolutions of said spindle.

20. A method according to claim 12, wherein said step of analyzing said signal includes uni-dimensional correlation of said signal to determine a main harmonic of said signal, an amplitude $H_0$ of said harmonic being expressed by $$H_0 = \frac{1}{\pi}\left[\cos\phi_0 \int_0^{2\pi} A(\phi)\cos\phi d\phi - \sin\phi_0 \int_0^{2\pi} A(\phi)\sin\phi d\phi\right]$$

and a phase angle $\theta_0$ of said harmonic being expressed by $$\theta_0 = \tan^{-1}\left[\frac{\int_0^{2\pi} A(\phi)\sin\phi d\phi}{\int_0^{2\pi} A(\phi)\cos\phi d\phi}\right],$$

$A(\phi)$ being representative of said signal, $\phi$ being representative of said angular position, and said phase angle $\theta_0$ being representative of an angular offset of said spindle with respect to a predetermined reference position.

21. A method according to claim 12, wherein said disk pack includes at least two magnetic disks and at least one spacer between each pair of said magnetic disks.

22. A spinstand of a magnetic head and disk tester with a built-in balancing system comprising:
   A. a base plate;
   B. rotary drive means for driving a spindle, rotatable with respect to and supported by said base plate;
   C. disk supporting means for supporting at least one magnetic disk, attached to said rotating spindle;
   D. at least one balancing cap concentrically attached to said rotating spindle of said rotary drive means and having an imbalance adjusting means including a plurality of uniformly spaced opening is provided in the peripheral portion of said at least one balancing cap, and at least one insert that can be put into at least one of said plurality of openings;
   E. a magnetic head holder supporting at least one magnetic head and being moveable on said base plate with respect to said disk supporting means so that at least one magnetic head can be placed on at least one test magnetic disk for testing purposes; and
   F. means for measuring an amount of imbalance of said spindle with said disk supporting means, at least one magnetic disk, and at least one balancing cap.

23. The spinstand of claim 22, further comprising linear guide means for guiding said magnetic head holder, and a slider moveable along said guide means with respect to said disk supporting means, said magnetic head holder being attached to and moveable together with said slider with respect to said disk supporting means.

24. The spinstand of claim 22, and further comprising disk securing means for securing at least one magnetic test disk to said disk supporting means with a predetermined pre-loading force, at least one balancing cap being an integral part of said disk securing means.

25. A spinstand of a magnetic head and disk tester with a built-in balancing system comprising:
   A. a base plate;
   B. rotary drive means for driving a spindle, rotatable with respect to and supported by said base plate;
   C. disk supporting means for supporting at least one magnetic disk, attached to said rotating spindle;
   D. at least one balancing cap concentrically attached to said rotating spindle of said rotary drive means and having an imbalance adjusting means including a plurality of uniformly spaced openings provided in the peripheral portion of said at least one balancing cap, and at least one insert that can be put into at least one of said plurality of openings, wherein said openings are realized as radial threaded openings, and at least one insert is at least one screw that can be screwed into at least one of said radial threaded openings;
   E. a magnetic head holder supporting at least one magnetic head and being moveable on said base plate with respect to said disk supporting means so that at least one magnetic head can be placed on at least one test magnetic disk for testing purposes; and
   F. means for measuring an amount of imbalance of said spindle with said disk supporting means, at least one magnetic disk, and at least one balancing cap.

26. A spin stand of a magnetic head and disk tester with a built-in balancing system comprising:
   A. a base plate;
   B. rotary drive means for driving a spindle, rotatable with respect to and supported by said base plate, wherein said rotary drive means has a stationary part provided with means for switching between a rigid attachment, and a spring-loaded attachment of said stationary part to said base plate.
   C. disk supporting means for supporting at least one magnetic disk, attached to said rotating spindle;
   D. at least one balancing can concentrically attached to said rotating spindle of said rotary drive means and having an imbalance adjusting means including a plurality of uniformly spaced openings provided in the peripheral portion of said at least one balancing cap, and at least one insert that can be put into at least one of said plurality of openings;
   E. a magnetic head holder supporting at least one magnetic head and being moveable on said base plate with respect to said disk su p porting means so that at least one magnetic head can be placed on at least one test magnetic disk for testing purposes; and
   F. means for measuring an amount of imbalance of said spindle with said disk supporting means, at least one magnetic disk, and at least one balancing cap.

27. spinstand of a magnetic head and disk tester with a built-in balancing system comprising:
   A. a base plate;
   B. rotary drive means for driving a spindle, rotatable with respect to and supported by said base plate; wherein said spindle of said rotary drive means is provided with reference means generating index pulse in a certain angular position of said rotating spindle in respect to said stationary part of said rotary drive means;
   C. disk supporting means for supporting at least one magnetic disk, attached to said rotating spindle;
   D. at least one balancing cap concentrically attached to said rotating spindle of said rotary drive means and having an imbalance adjusting means including a plurality of uniformly spaced openings provided in the peripheral portion of said at least one balancing cap, and at least one insert that can be put into at least one of said plurality of openings;

E. a magnetic head holder supporting at least one magnetic head and being moveable on said base plate with respect to said disk sup porting means so that at least one magnetic head can be placed on at least one test magnetic disk for testing purposes; and F. means for measuring an amount of imbalance of said spindle with said disk supporting means, at least one magnetic disk, and at least one balancing cap.

28. The spinstand of claim 27, wherein said means for measuring an amount of imbalance include imbalance magnitude measuring means rigidly attached to said stationary part of said rotary drive means, and a measurement data processing means connected to said imbalance magnitude measuring means and to said reference means.

29. A method for balancing rotating parts of a spinstand of a magnetic head and disk tester, at least some of said rotating parts being replaceable, said method comprising the steps of:

A. providing said spinstand with at least one balancing cap attachable to said rotating parts and having adjustable balancing means for compensating an imbalance condition, reference means for generating a plurality of reference index pulses corresponding to certain angular positions of said rotating parts, and measuring means for measuring an amount of imbalance of said rotating parts and angular position of the point of maximum imbalance in respect to said reference means;

B. installing said at least one balancing cap on said replaceable portion of said rotating parts;

C. installing and securing said replaceable portion of said rotating parts and securing said replaceable portion to said rotating part;

D. providing spring-loaded position of stationary housing of said rotating parts of said spinstand so that during rotation of said rotary parts said imbalance of said rotating parts will cause vibration;

E. calibrating said measuring means to determine weights of said adjustable balancing means, and angular shift between index pulse and zero point of said balancing cap;

F. setting said adjustable balancing means into pre-determined initial positions;

G. starting rotation of said rotating parts together with said balancing cap, said reference means, and said replaceable portion with the rotation speed that will be used for testing;

H. measuring an amount of imbalance and an angular position of said point of maximum imbalance in respect to said index pulses during said rotation, then stopping said rotation;

I. calculating angular position of said point of maximum imbalance in respect to said zero point of said balancing cap;

J. calculating the shifts of said imbalance adjusting means needed to compensate the imbalance;

K. adjusting positions of said imbalance adjusting means using said shifts;

L. repeating six previous steps of measuring and adjusting until said imbalance decreases to a level required for precision testing; and M. securing said rotary drive housing to said stationary housing of said rotating parts to make said spinstand ready for testing.

30. The method of claim 29, wherein said replaceable portion of said rotating parts is a pack of magnetic disks used for testing said magnetic heads.

31. The method of claim 29, wherein measurement step includes calculating an average data for a plurality of revolutions.

32. The method of claim 29, wherein said amount of imbalance and said angular position of said point of maximum imbalance are found after separating main harmonic of vibrations caused by said imbalance.

33. The method of claim 32, wherein uni-dimensional correlation analysis is used to separate said main harmonic of said vibrations.

34. The method of claim 29, wherein a light source attached to said stationary housing of said rotating means is used to determine said angular shift between said index pulse and zero point of said balancing cap.

35. The method of claim 29, wherein an automated calibration procedure is used to determine said angular shift between said index pulse and zero point of said balancing cap.

36. The method of claim 35, wherein said automated calibration procedure comprise the steps of:

A. setting said adjustable balancing means into pre-determined initial positions;

B. starting rotation of said rotating parts together with said replaceable portion at the rotation speed that will be used for testing;

C. measuring said amount of imbalance and said angular position of said point of maximum imbalance in respect to said index pulses during said rotation;

D. stopping said rotation;

E. changing imbalance condition by changing radial position of one of the said adjustable balancing means;

F. repeating the second, the third, and the fourth step to measure new values of said amount of imbalance and said angular position of said point of maximum imbalance in respect to said index pulses during said rotation;

G. calculating proportionality coefficient between centrifugal force and the amplitude of the pre-processed measured signal, and angular shift between index pulse and zero point of said balancing cap from the results of two said measurements;

H. setting said adjustable balancing means back into pre-determined initial positions.

* * * * *